United States Patent [19]

Bezinge et al.

[11] Patent Number: 5,373,645

[45] Date of Patent: Dec. 20, 1994

[54] APPARATUS FOR THE MEASUREMENT OF LINEAR VALUES

[75] Inventors: Alex Bezinge, Yens; Ulf Birkner, Le Mont/Lausanne; Adrian Orita, Renens; Adriano Zanier, Prilly; Charles Zufferey, Lausanne, all of Switzerland

[73] Assignee: TESA S.A., Switzerland

[21] Appl. No.: 82,753

[22] Filed: Jun. 25, 1993

[30] Foreign Application Priority Data

Jul. 16, 1992 [CH] Switzerland .......... 02-248/92-1

[51] Int. Cl.$^5$ .............................................. G01B 5/02
[52] U.S. Cl. ........................................ 33/703; 33/832; 33/556
[58] Field of Search .............. 33/703, 705, 706, 707, 33/708, 710, 711, 832, 503, 572, 556; 73/865.8, 866.5

[56] References Cited

U.S. PATENT DOCUMENTS

| | | | |
|---|---|---|---|
| 3,293,759 | 12/1966 | Moe et al. ............... | 33/708 |
| 3,958,336 | 5/1976 | Denroche ............... | 33/707 |
| 4,037,325 | 7/1977 | Weber et al. ........... | 33/707 |
| 4,845,855 | 7/1989 | Meyer ..................... | 33/832 |
| 4,924,598 | 5/1990 | Gruhler ................... | 33/503 |
| 4,964,220 | 10/1990 | Orr et al. ............... | 33/503 |
| 5,040,308 | 8/1991 | Meyer ..................... | 33/832 |

Primary Examiner—Thomas B. Will
Attorney, Agent, or Firm—Anthony J. Casella; Gerald E. Hespos

[57] ABSTRACT

The apparatus comprises a bearing plate (1), a slideway (2) and a girder (3) which are perpendicular to the bearing plane of the bearing plate, a slide (4) with tracer head (5) movable along the slideway and a drive plate (7) located in front of the slide and stabilized by guides (8, 9) independent of the slide. The plate (7) and the slide (4) are connected by balancing (10) and damping (11) springs. A drive device by cable (13) and return pulleys (15-18) which is moved by a movement generator (19) is connected to the plate (7) and is entirely supported by the girder (3) and the bearing plate (1). A counterweight (14) inserted in the circuit of the cable (13) balances the weight itself of the movable elements (4, 7). A body (63) for protection against impacts is fastened to the girder (3) and to the bearing plate (1).

13 Claims, 4 Drawing Sheets

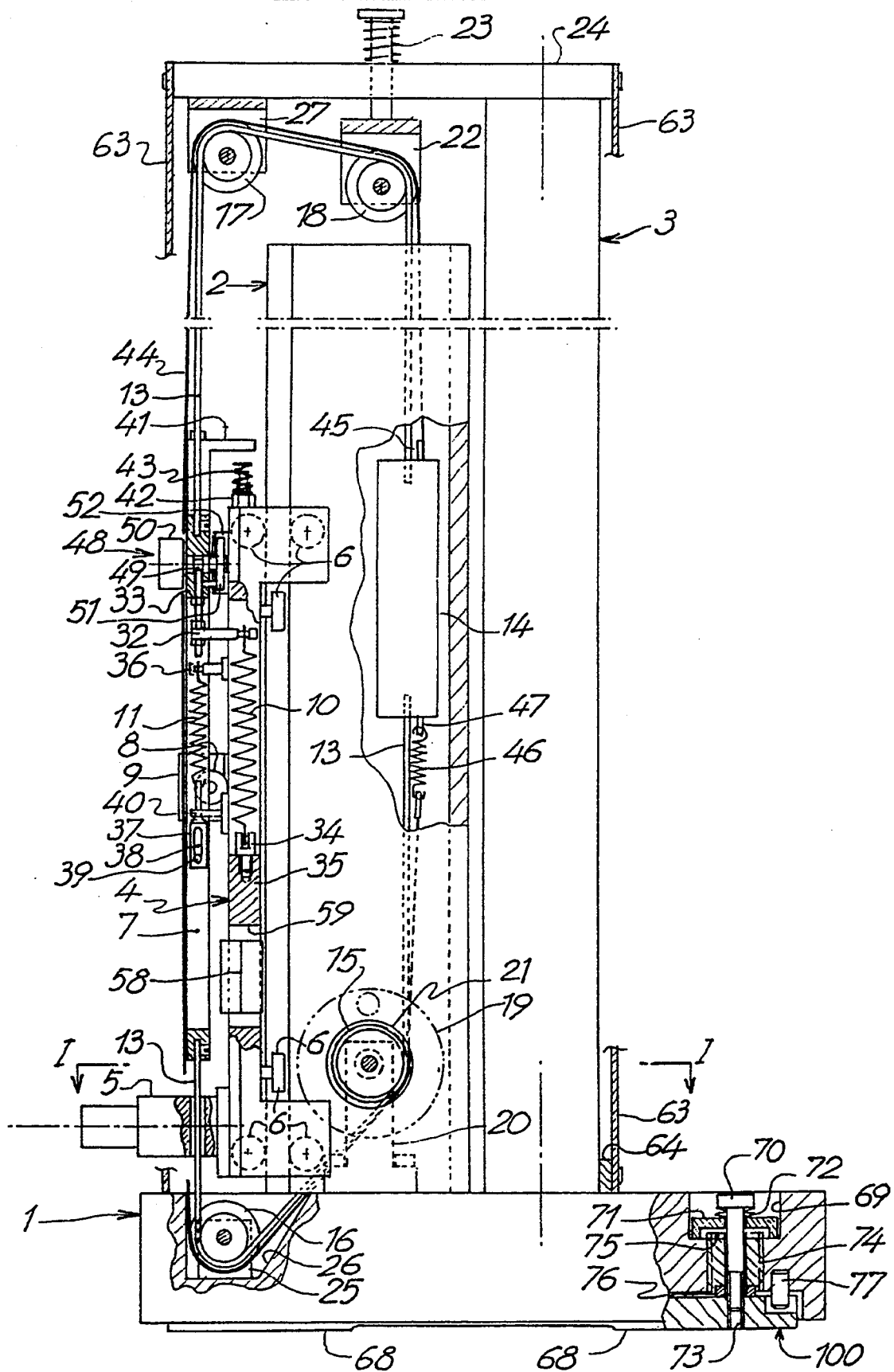

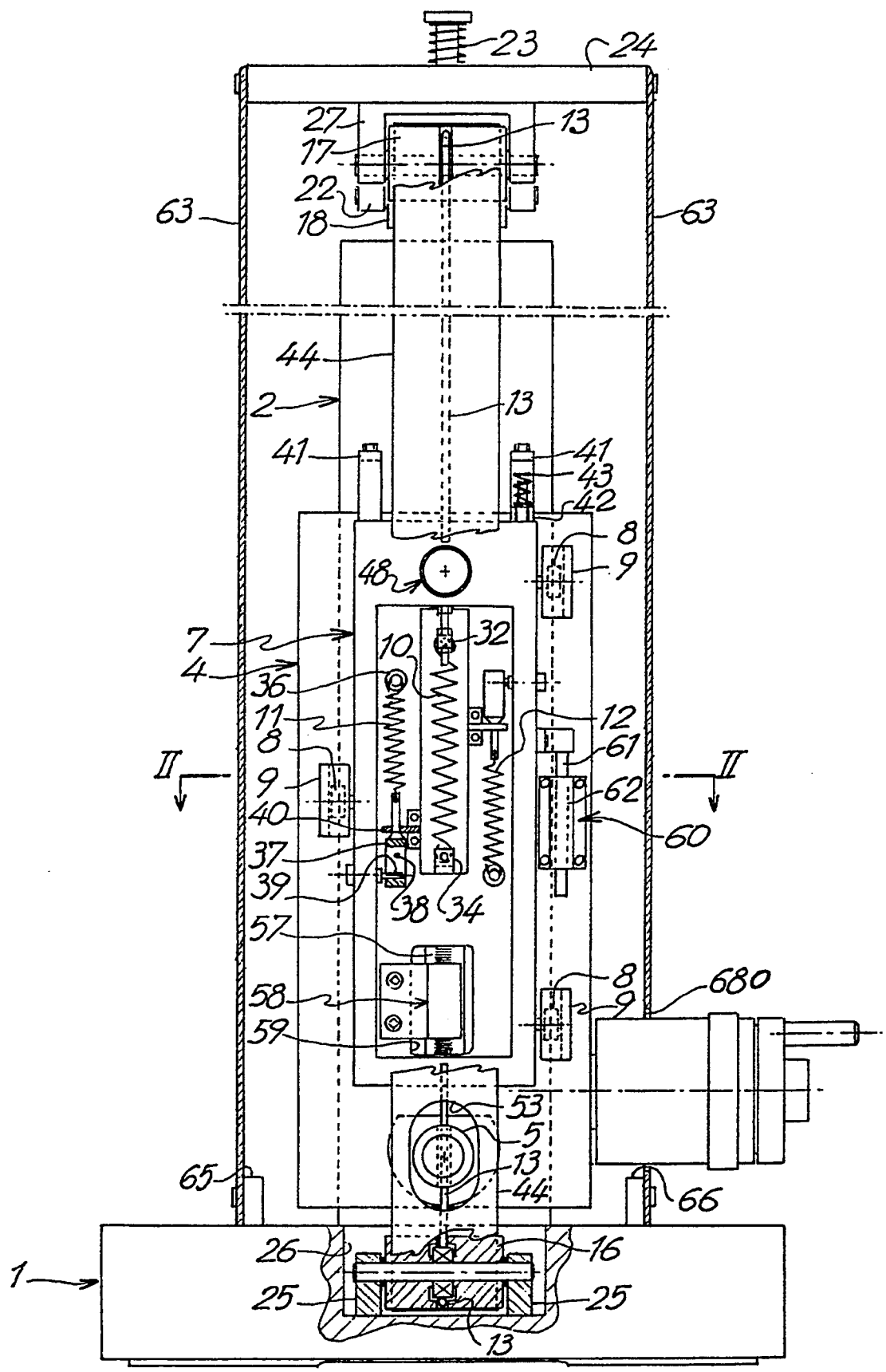
FIG.-2-

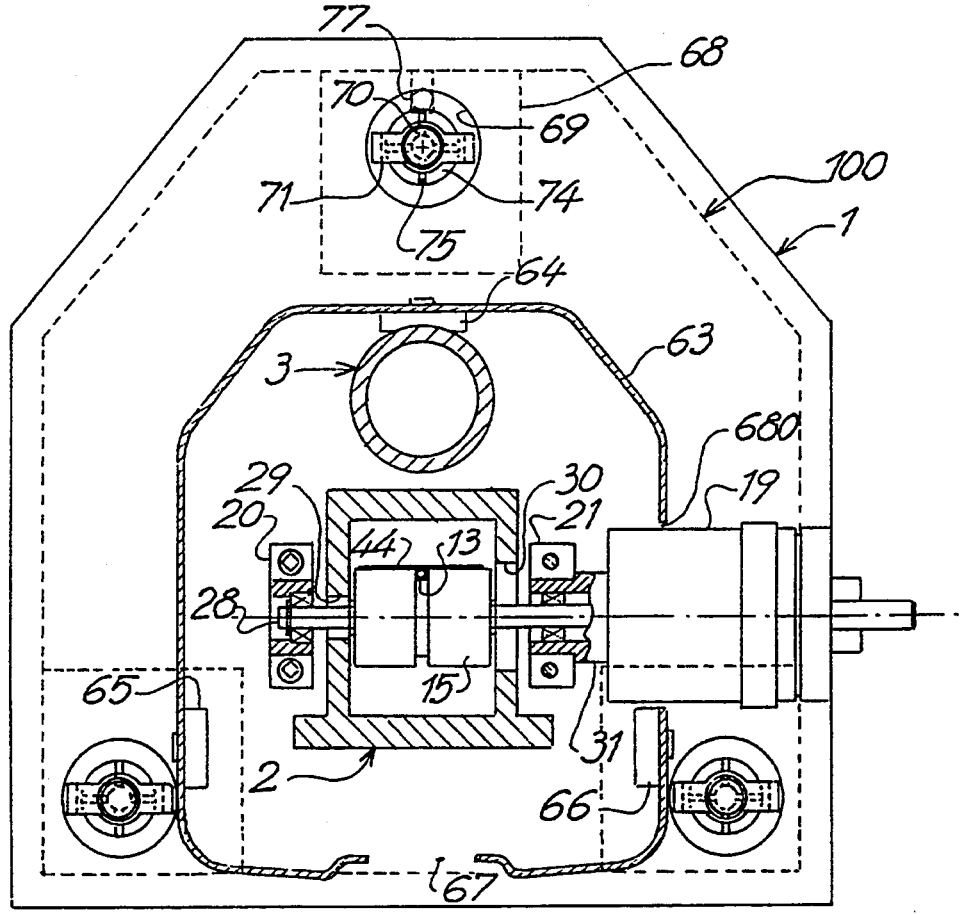
FIG.-3-
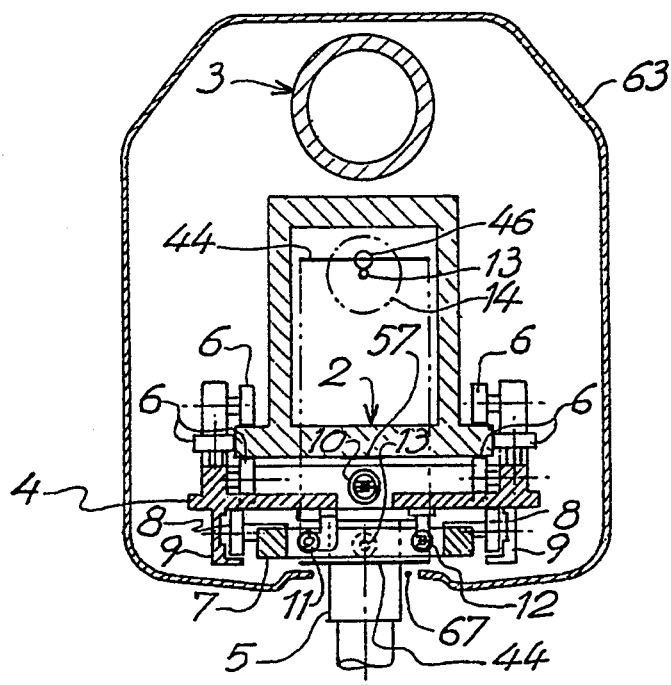
FIG-4-

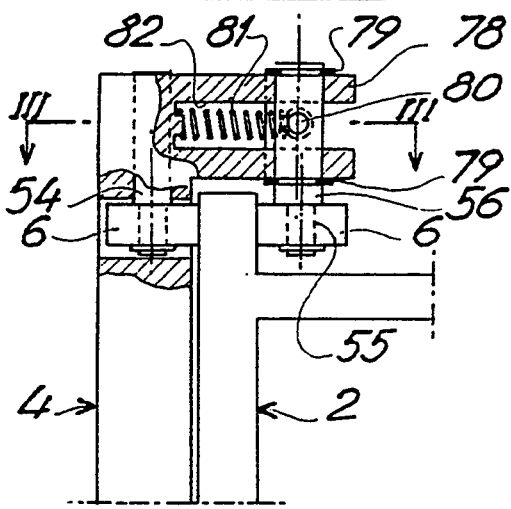
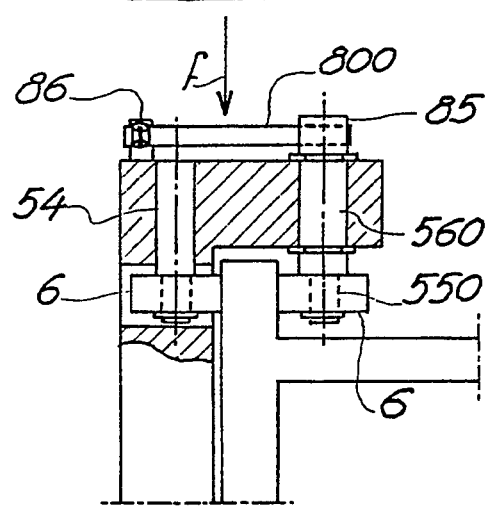
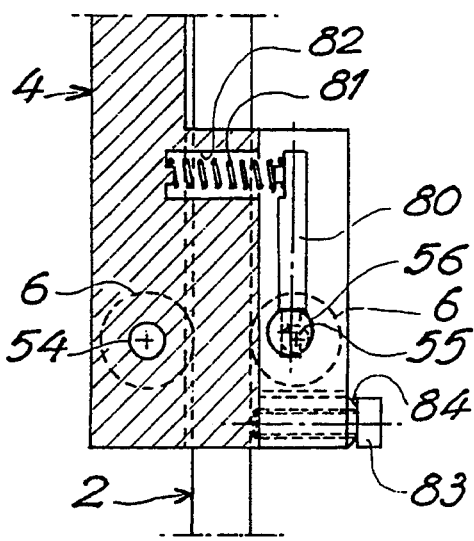
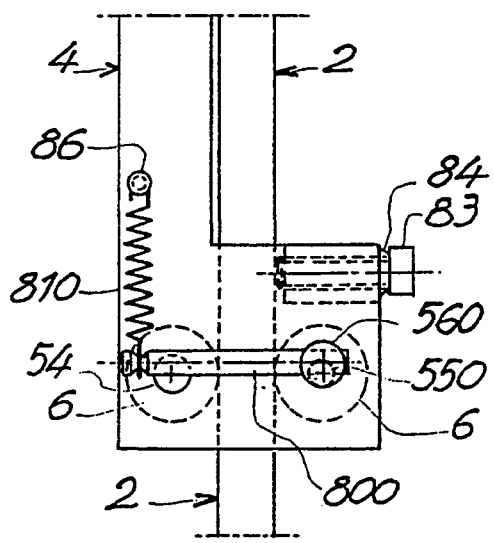

APPARATUS FOR THE MEASUREMENT OF LINEAR VALUES

The object of the present invention is an apparatus for measuring linear values which comprises a frame, a guide slideway which is fastened to the frame and directed parallel to one direction of measurement, a slide with means for sliding along the slideway, a measurement head with tracer probe associated with the slide, a device for detecting the position of the tracer probe along the guide slideway, at least one movement generator having a transmission for displacing the slide along the slideway, a housing, and a protective device for protecting at least the measurement head from impacts and from the stresses caused by the actuation of the movement generator and by its transmission.

Apparatuses for the measurement of linear values which comprise such elements are used in shops for the manufacture of mechanical parts for purposes of the measurement and verification of their dimensions.

These units are generally associated with a horizontal flat table or measurement bench on which the part to be measured or checked is held stationary in a selected position so that said bench constitutes a reference plane for the measurement of heights and the measurement of bores with axes of resolution parallel to said plane.

Depending on the type of apparatus, it comprises either three slideways directed parallel to three axes of rectangular coordinates two of which are included in the plane of the measurement bench, as in three dimensional measurement apparatuses, or else a single slideway arranged perpendicular to the plane of the measurement bench, as in a height and bore hole measurement apparatus.

In three-dimensional measurement apparatuses, the slideway with which the said elements are associated is generally fastened to a guide system intended to displace it in two directions parallel to the other two coordinate axes and comprising means for detecting its position along these two axes, the guidance system being borne by a rigid frame which is connected to the measurement bench.

In height-measuring apparatuses, the slideway is fastened on a rigid column comprising a bearing plate which is displaceable by sliding on the measurement bench.

There are also length measurement apparatuses which comprise the aforementioned measuring elements and in which the slideway is rigidly connected to a measurement bench or horizontal calibration bench, they being used in particular for checking and calibrating parts of long length.

Due to the inertia of the elements which are displaced during the measurement operations and concur in placing the tracer probe in contact with the part to be measured, and due to the sensitivity to impacts and stresses of the elements of the measurement head, risks of the breaking, deformation or loss of adjustment of the measurement system are always to be feared.

This is why the measurement head on these apparatuses is always covered, at least in part, by a protective housing and why, furthermore, other protections are also provided, in particular by elastic or other balancing connections established between the measurement head and the slide in the direction of measurement.

Thus, for instance, on a height measurement apparatus described in EP 0223736, the measurement head which bears the tracer probe is mounted for movement in the direction of measurement and relatively with respect to the slideway, and is held in a equilibrium by means of a counterweight within the slide in a position corresponding to the measurement zero by an elastic engagement positioner. On this apparatus, the protective housing of the measurement head is integral with the slide, and the device used to displace the slide is rigidly attached to it. The system of balancing the measurement head by counterweight within the slide makes it possible to see to it that the slide is removed from the bad effects of the oscillations generated by the actuation of the displacement device which is firmly attached to said slide.

In another height measurement apparatus, described in CH 667726, the measurement head bearing the tracer probe is mounted for movement in the direction of measurement on the slide and held in equilibrium on the latter and in said direction by the opposing forces of two compression springs placed in opposition on the two sides of said slide, these springs being also used to apply a predetermined tracing force by the tracing probe on the part to be measured during the measuring process, this tracing force being controlled by a device for the detection of the relative displacement of the measurement head with respect to the slide. On this apparatus, the protective housing of the measurement head is fastened on the slide and the latter is displaced along the slideway by the belt of a movement transmission system of the pulley and endless-belt type, driven by a drive placed on a column bearing the slideway.

In another height measurement apparatus, described in EP 0421922, the slide is formed of a first displacement partial slide, connected to a movement transmission belt actuated by a drive placed on a column bearing the slideway, and of a second measurement partial slide bearing the tracing head and connected to the first slide by a spring connection comprising a balancing tension spring and two compression springs placed in opposition in order, here also, to apply a given tracing force controlled by a displacement detector, these two partial slides being slidable, one after the other, on the slideway.

On these height measurement apparatuses, the combination of the protective means for the measurement head, housing and/or balancing in the direction of measurement are satisfactory. They make it possible, to a certain extent, to overcome the customary risk of displacements of the column on the measurement bench which are made necessary by the placing in contact of the tracing probe with the part to be measured and which may cause more or less sudden encounters between said part and the measurement head; they also make it possible to dampen the oscillations generated by the device for the displacement of the slide along the slideway.

The object of the invention is to protect the measurement head bearing the tracing probe even more from the bad effects of the impacts and stresses induced by the operations of contacting the tracing probe with the part to be measured.

For this purpose, the apparatus in accordance with the invention, which is of the type defined at the beginning of the specification, is characterized by the fact that it comprises a drive plate connected to the movement transmission, guide means which are independent of the slideway in order to stabilize the drive plate with respect to the latter, balancing and dampening connecting means between the drive plate and the slide, and a beam which is independent of the slideway and is fastened rigidly to the frame in order, by itself or together with the frame, to support the housing, the generator, and the movement transmission.

In this way, not only the slide bearing the measurement head but also the slideway which guides it are disconnected from the aforementioned elements—housing, generator and movement transmission—which are capable of transmitting impacts and oscillations to them, these phenomena being largely damped before reaching them by the mass of the frame and of the beam which support these elements.

Details of shape and arrangement of the elements which characterize the invention, which are evident from the following description, provide additional advantages within the scope of the purpose sought of protecting the sensitive elements of the apparatus in the best possible manner against any harmful or disturbing phenomenon.

The accompanying drawing shows, by way of example, one embodiment of the object of the invention, as well as a variant of a detail.

FIG. 1 is a profile view thereof, in partial section.

FIG. 2 is a face view thereof, also in partial section.

FIG. 3 is a plan view in partial section along the section axis I—I of FIG. 1.

FIG. 4 is a plan view in partial section along the section axis II—II of FIG. 2.

FIG. 5 is a detail view from above, in partial section, of a device associated with an element of this embodiment.

FIG. 6 is a partial section along the section axis III—III of FIG. 5.

FIG. 7 is a detail view from above, in partial section, of a variant of the device shown in FIGS. 5 and 6.

FIG. 8 is a profile view of the variant, in the direction indicated by the arrow f in FIG. 7.

The measurement apparatus shown is of the type with independent height measurement columns, having a frame 1, referred to as flat bearing plate, displaceable by sliding on a flat horizontal reference table, not shown, on which a part to be measured is placed or fixed by a known method such as that described, for instance, in the aforementioned CH 667726.

On the bearing plate 1 there are rigidly implanted a guide slide 2 and a girder 3 which are parallel to each other, independent of each other, and perpendicular to the resting plane of the bearing plate 1, the girder 3 being located behind the slideway 2 with respect to the active front face of the apparatus.

A slide 4, bearing a measurement head 5, is mounted for movement by translation along the slideway 2 by means of trains of rollers 6 gripping around the latter on its four guide faces by, in the example described, groups of three on its four corners.

A play take-up device operating by the application of an elastic prestressing of constant pressure of the rollers 6 on the guide faces of the slideway 2 makes it possible automatically to take up this play.

This device, shown in FIGS. 5 and 6, comprises, for each pair of rollers gripping two opposite and parallel faces of the slideway 2, a first roller 6 mounted for rotation on a first shaft 54 fastened rigidly to the slideway 4 and a second roller 6 mounted for rotation on an eccentric end of a second shaft 56, in its turn, mounted for rotation across two arms of a fork 78 borne by the slideway 4. The shaft 56 is held fast axially by two circlips 79 placed on opposite sides of the fork 78 and it has a tongue 80 which passes between the two arms of this fork. The tongue 80 is subjected at its free end to the thrust of a compression spring 81 housed in a debouching hole 82 of the slideway 4. The angular positioning of the tongue 80 with respect to that of the eccentric part 55 of the shaft 56 is such that a force of pressure on the slideway 2 is transmitted to the roller 6, this force of pressure being a function of the thrust developed by the spring 81 and of the ratio between the eccentricity of said shaft 56 and the lever arm of the tongue 80.

An adjustable screw stop 83, visible only in FIG. 6, the axis of which is perpendicular to the face of the slideway 2 onto which there is pressed a roller 6 which is subjected to the aforementioned pressure force, is placed in engagement in a corresponding threaded hole of the slideway 4 and is braked in rotation by an elastic washer 84.

This play take up device which is of mild and constant action, which assures an almost perfect linear guidance under the normal stresses in use, makes it possible, by its instantaneous elastic response, to protect the guide rollers 6 from the harmful effects of sudden accelerations such as, for instance, those developed upon sudden advance with high speed, excessively rapid reversal of direction of operation, or direct traction on the slide.

The screw stop 83 makes it possible to adjust and limit the elastic take-up play in order in order to have only the pressure necessary for the normal intended operation without overloading the rollers. This screw-stop 83 thus also plays the role of end detachment limiter when the rollers 6 are subjected to the aforementioned sudden acceleration effects.

However, it is obvious that this screw stop 83 is not indispensable on an apparatus of the parts of which are only of slight weight and the rollers 6 and shafts of which are amply dimensioned.

The play take-up device described, despite the said advantages relative to the protection of the apparatus from impacts and exceptional stresses, is not indispensable. Any other precision linear guide system can also be used without going beyond the scope of the invention.

A drive plate 7, in the shape of a frame, is placed in front of the slide 4, superposed in position parallel to the latter; it is stabilized in this position, without rubbing, by three rollers 8 which engage with play in three portions of U-shaped rails 9 which are rigidly fastened to the slide 4, and it is connected to the latter, in the direction of its displacements along the slideway 2, by a train of three traction springs 10, 11 and 12 constituting a balancing and shock-absorbing floating suspension between these two elements, the functions of which are defined below.

The drive plate 7 is connected by its upper and lower ends to a cable 13 forming a closed circuit with a counterweight 14 and constituting a movement transmission guided by four return pulleys 15, 16, 17 and 18, one of which, 15, is mounted on the output shaft 28 of a movement generator 19. The driving is effected by friction of the cable 13 on the drive pulley 15.

The strand of the cable 13 connected to the counterweight 14 passes with the latter within the guide slideway 2 without touching the walls of the latter. The top and bottom pulleys 15 and 18 of this strand are borne, the former at the bottom by two bearings 20 and 21 fastened to the bearing plate 1 on both sides of the slide 2, and the latter, at the top, by a yoke 22, with spring tensioner 23 supported by a bracket 24 fastened on the top of the girder 3.

The other two pulleys 16 and 17 of the strand of the cable 13 connected to the drive plate 7 are borne, the former one at the bottom, by two bearings 25 fastened in a cavity 26 of the bearing plate 1 and the latter at the top by a yoke 27 fastened to the bracket 24.

The shaft 28 of the drive pulley 15 passes through two holes 29 and 30 in the opposite side walls of the slideway 2 and one of these two holes, the hole 30 located on the side of the movement generator 19, is of a larger diameter than the said pulley 15 in order to facilitate its mounting. On its part, the movement generator 19 is entirely supported by the bearing 21 in which its own output bearing 31 is engaged.

By this arrangement of the system of transmission by cable 13 in which the load of the return pulleys 15 to 18 is borne solely by the bearing plate 1 and the girder 3, the guide slideway 2 of the slide 4 is completely insulated from the oscillations generated by the device for the displacement of the drive plate 7, the movement generator 19 being furthermore supported by the bearing plate 1.

The central spring 10 of the train of traction springs 10, 11 and 12 is tensioned in adjustable manner between a bracket 32 fastened to the upper crossmember 33 of the drive plate 7 and a yoke 34 fastened to a crossmember 35 of the slide 4 in order to balance the weight itself of the latter fully equipped with its measurement head 5 and a tracing probe, not shown, fastened at the end thereof.

On its part, the counterweight 14 is provided to balance all of the suspended masses, that is to say, the aforesaid assembly of the slide, the measurement head, and the tracing probe, plus the weight itself of the drive plate 7.

The two lateral springs 11 and 12 of the train of traction springs 10, 11 and 12 are installed in parallel positions, but in opposition, so as to be able to develop in one direction as well as the other a measurement pressure from a neutral position corresponding to the equilibrium of the two elements which they connect, obtained by means of the aforesaid central spring 10.

Each of these two springs 11 and 12 is fastened at one end to a bracket 36 fastened on the slide 4 and at the other end to a connecting rod 37 having a stroke-limiting slideway 38 in which there is engaged a second bracket 39 fastened to the drive plate 7, this connecting rod 37 being guided in translation by an intermediate bearing 40 fastened to the slide 4.

This use of two opposing springs in order to obtain a measurement pressure which can be applied by the tracing probe on the part to be measured customarily employs two compression springs placed directly in opposition on opposite sides of an arm which is integral with one of the two elements which they connect. Here, the use of two traction springs placed in opposition in parallel positions makes it possible to avoid any rubbing inherent in the axial guidance, which would be indispensable in case of the use of compression springs.

In order to overcome any sudden contacting of the tracing probe with the part to be measured in the directions of displacement in height of the slide 4 by the drive plate 7, which would have the effect of exceeding the relative stroke provided for the latter with respect to the slide, two double-acting stop devices are provided, also in opposition of action in order to operate in both directions.

These two devices are composed, in the case of each of them, of a bracket 41 fastened to the upper part of one of the two relatively movable elements, slide or drive plate, and of a stop 42 with coaxial compression spring 43 fastened to the other element and placed below the bracket 41 so that, in an initial period of displacement corresponding to the permitted limit stroke, the spring 43 is alone stressed. After this limit stroke, the bracket 41 comes against the stop 42 and it is then the cable 13 of the drive device which takes up the excess stress by friction on the drive pulley 15, without acting on the slide 4 or the slideway 2.

This additional safety is not indispensable but it can be obtained and applied here advantageously due to the principle of the invention.

An indirect blocking device 48 is provided here in order to immobilize the slide 4 with respect to the drive plate 7 in the event of the use of the apparatus for a measurement of perpendicularity with an additional measurement probe, for the measurement with auxiliary probes, or else for use as marking tool.

This blocking device, shown in detail in FIG. 1, is formed of screw 49 with manual drive button 50, which is axially held in the drive plate 7, moving in translation a radial retention nut 51 in order to immobilize a blade 52 fastened to the slide 4 by clamping against the drive plate 7.

The circuit of the cable 13 and the drive plate 7 to which it is connected is covered here by a flexible protective belt 44, formed for instance of a plasticized fiberglass fabric, also guided by the four pulleys 15 to 18 and fastened at one end to a stud 45 integral with the upper face of the counterweight 14 and at the other end to a tension spring 46 held by a second stud 47 integral with the lower face of said counterweight. The guide pulleys 15 to 18 are developed in two steps: a central part of smaller diameter for the guiding of the cable 13 and two lateral parts forming a barrelled pulley for the guiding of the protective belt 44, the central part being disconnected from the two side parts, as shown in detail in the case of the pulley 16 at the bottom of FIG. 2, except, however, with respect to the drive pulley 15 in which these three parts are rigidly connected together and fastened to the shaft 28 of the movement generator 19.

At the level of the measurement head 5 and at the level of the button 50 of the blocking device 48, the belt 44 has an opening elongated in the direction of its displacement to permit the differences in displacement between it and the cable 13, only the opening thereof at the level of the measurement head 5, designated 53, being visible in FIG. 2.

The drive plate 7 and the slide 4 can comprise a device for the stabilizing of the relative position of equilibrium; this device (not shown) may consist, for instance, of a magnetic brake.

With regard to the measuring means of the apparatus, it comprises a graduated scale 57, for instance of glass with contrasted division marks, a first position detector 58, for instance an opto-electronic detector, placed opposite the scale 57 through an opening 59 in the slide 4 and the housing of which is fastened to the latter, and a second detector 60, the cursor 61 of which is fastened to the drive plate 7 and the body 62 of which, which comprises the sensitive track, is fastened to the slide 4. The first detector 58 supplies an electric signal representative of the actual position of the tracing probe with respect to the bearing plane of the sole plate 1 and the second detector 60 supplies a signal of relative displacement between the slide 4 and the drive plate 7 representative of the tracing force applied in one direction or the other of this displacement. These signals are transmitted by a cable (not shown) connected to a control desk (also not shown) comprising, in particular, a display of the values represented by these signals.

With respect to the protective housing, it is formed here by a body 63 of metal plate surrounding the assembly of the parts of the apparatus aside from its bearing plate 1 and fastened by its upper part to the periphery of the bracket 24, capping the girder 3 and by its lower part to three studs 64, 65 and 66 implanted in the bearing plate 1, without any contact therefore with the slideway 2, the drive plate 7, the slide 4 or the sensitive elements which they bear.

This body 63, which is visible in cross section in FIG. 3 and 4, comprises a vertical opening 67 of a width greater than that of the measurement head 5 and extending along the stroke of the latter and of the button 50 of the blocking device 48. This opening 67 is furthermore closed in the manner of a curtain by the ribbon 44 which is located between it and the drive plate 7, as can be clearly noted from FIG. 4. On the side of the movement generator 19 this body also has a circular opening 680 of free passage.

The protection is therefore almost total here, both against impacts and against pollutions.

The bearing plate 1 has the feature here of comprising a counter bearing sole plate 100 engaged in its lower face, having three spaced flat bearing facets 68 forming a triangular supporting polygon which is connected to it above these three facets 68 by three bearing connection devices of adjustable height with controlled, constant prestressing. Each of these three devices has for this purpose, engaged in a chambering 69 in the upper face of the bearing plate 1, a central screw 70 which bears against a cross-member 71 supported on the bottom of said chambering via elastic washers 72 and the threaded part of which is in engagement in a threaded hole 73 and a counter bearing plate 100.

The screw 70 passes freely through a concentric threaded plug 74 in engagement in a corresponding threaded hole in the bearing plate 1 and comprising a crosswise engagement 75 on its upper face, below the cross-member 71.

Between the threaded plug 74 and the counter bearing plate 100 there is interposed a spacer washer 76; however, the latter is not indispensable.

In each of these three devices formed in this manner, the central screw 70 and the elastic washers 72 make it possible to apply a constant clamping force of the counter bearing plate 100 against the threaded plug 74 and to take up the operating play between the latter and the bearing plate 1, and this threaded plug 74 permits a fine adjustment of the perpendicularity of said counter bearing plate 100 with respect to the guide faces of the slideway 2.

Positioning pins 77 for the counter bearing plate 100 with respect to the bearing plate 1 are provided in order to avoid any relative displacement between these two parts.

These connecting devices are not indispensable in view of the purpose of the invention but they, however, provide the advantage of avoiding any shaking between the bearing plate and its counter bearing plate.

Of course, the apparatus described is not limitative with respect to the manners of application of the principle of the invention.

For example, in the application of the invention to a horizontal measurement bench, it is obvious that the central spring 10 for the balancing of the weight of the slide 4 itself is needless. as is the counterweight 14.

The measurement head 5 can be mounted for movement in the direction perpendicular to the direction of measurement in a device for the automatic determination of the turning-back point of the tracer upon the process of measuring a bore or a shaft, such as, for instance, the device described in CH 667726, cited above.

The flexible protective belt 44 is not indispensable and can be eliminated in an economical embodiment, making it possible to simplify the transmission by replacement of the step pulleys 15–18 by single-groove pulleys. However, this belt 44 contributes an additional advantage in the means of protecting of the sensitive parts of the apparatus from pollution by outside agents such as dust and possible splatterings of oily liquids in a machine shop.

The device 48 for blocking the position of the slide 4 below the drive plate 7 is not indispensable either and can be eliminated on an apparatus which is not intended to be used with additional tracers or as marking tool.

The superposed position of the drive plate 7 in front of the slide 4 is not limitative either, and it is not out of the question to insert said plate within a guide housing which is integral with the slide 4, as for instance in GB 1108792, without going beyond the scope of the invention, provided however that all the stresses of the transmission of movements are borne by the girder 3 and/or the bearing plate 1.

The use of traction springs 10, 11 and 12 is also advantageous here not only by the eliminating of the aforementioned rubbing but also by the selection which it makes possible of a simple position stabilization system which is free of rubbing of the drive plate 7 on the slide 4, by means of three rollers 8 engaged with play in three sections of rails 9.

However, the customary use of compression springs is not excluded subject, however, to a more elaborate guidance of the drive plate, made necessary by the transverse components generated by the compression of this type of spring, in order not to penalize the isolating of the slide 4 by rubbings induced by these components.

Likewise, the stabilization assembly formed by the rollers 8 engaged in the rail sections 9 can be replaced by rollers of V-section rolling on pairs of rods fastened to the slide 4.

Finally, the play take-up device for the guide rollers 6 of the slide 4 on the slideway 2, represented in FIGS. 5 and 6, can be realized in some other manner, for instance by means of a traction spring, as in the variant of this device shown in FIGS. 7 and 8.

In this variant, the roller 6, pressed elastically on the slideway 2, is also mounted for rotation on an eccentric part 550 of a shaft 560, but the latter is itself mounted for rotation across the thickness of a lateral wall of the slide 4 and debouches from it by an extension 85 bearing an outer tongue 800.

The free end of the tongue 800 is subjected to the traction of a traction spring 810 attached to a pivot 86 fastened to the slide 4 in such a manner that a force of pressure on the slideway 2 is transmitted to the roller 6 in question, in the same way as in the play take-up device already described and shown in FIGS. 5 and 6. As in the device already described, this variant comprises an adjustable screw stop 83 having the same functions, the axis of which is perpendicular to the face of the slideway 2 against which the roller 6 is elastically pressed.

We claim:

1. An apparatus for measuring linear values comprising a frame, a guide slideway rigidly fastened to the frame and oriented parallel to one direction of measurement, a slide having means for sliding along the slideway, a measurement head with tracing probe associated with the slide, a device for detecting the position of the tracing probe along the guide slideway, at least one movement generator with a transmission for displacing the slide along the slideway, a housing and a protective device for protecting at least the measurement head from impacts and from the stresses caused by the actuation of the movement generator and by its transmission, characterized by the fact that it comprises a drive plate (7) connected to the movement transmission (13, 15-18), guide means (8, 9) independent of the slideway (2) for stabilizing the drive plate with respect to it, balancing and damping connecting means (10, 11, 12) between the drive plate and slide (4), and a girder (3) independent of the slide and fastened rigidly to the frame (1) in order, by itself or together with the latter, to support the housing (63), the generator (19) and the movement transmission (13, 15-18).

2. An apparatus according to claim 1, characterized by the fact that the drive plate (7) of the slide (4) is superimposed on the latter.

3. An apparatus according to claim 1, characterized by the fact that the guide means of the drive plate (7) are formed by three rollers (8) borne by said plate and engaged with play in three sections of U-shaped rails (9) fastened to the slide.

4. An apparatus according to claim 1, characterized by the fact that the connecting means between the drive plate (7) and the slide (4) are formed of a first traction spring (10) for balancing the weight of the slide (4) itself and of two second traction springs parallel to each other and in operational opposition, used as dampers and as generators of a measurement pressure in both directions of displacement of the slide.

5. An apparatus according to claim 1, characterized by the fact that the movement transmission is formed by a cable (13) guided in a close circuit by return pulleys (16-18) and a drive pulley (15) borne by the girder (3) and the frame (1), fastened to the drive plate (7), including in its circuit a balancing counterweight (14) of suspended masses, and moved by friction of said drive pulley (15) fastened on an output shaft (28) of said movement generator (19) fastened to the frame (1).

6. An apparatus according to claim 5, characterized by the fact that the circuit of the cable (13) is doubled by a flexible protective belt (44) passing in front of the drive plate (7), the slide (4) and the slideway (2), the pulleys (15-18) having for this purpose two steps, the one of smaller diameter driving and guiding the cable (13) and the other driving and guiding the flexible belt (44).

7. An apparatus according to claim 7, characterized by the fact that the relative displacement between the drive plate (7) and the slide (4) is limited by two double-acting stop devices, working in opposition to function in both directions of displacement of the slide and each formed of a bracket (41) fastened to one of the two elements, slide or drive plate, and by a stop (42) with coaxial compression spring (43) fastened to the other element and placed below the bracket.

8. An apparatus according to claim 5, characterized by the fact that the holding by friction of the cable (13) on the drive pulley (15) is adapted to yield in the case of an excess displacement of the slide (4) limited by two double-acting stop devices (41, 42, 43).

9. An apparatus according to claim 1, characterized by the fact that the frame (1) comprises an integrated counter bearing plate (100) which is connected to it in three spaced regions (68) forming a triangular support polygon by three bearing connection devices which are adjustable in height with controlled and constant prestress (69-74) for the take-up of play.

10. An apparatus according to claim 1, characterized by the fact that the slide (4) is mounted for movement by translation along the slideway by means of pairs of rollers (6) which, by each pair, clamp to opposite parallel guide faces of said slideway, and by the fact that it comprises, for each of these pairs of rollers, a play take-up device comprising a first roller mounted for rotation on a first shaft (54, 540) rigidly fastened to the slide (4), a second roller mounted for rotation of an eccentric end (55, 550) of a second shaft (56, 560), itself mounted for rotation in the slide, a tongue (80, 800) fastened to said second shaft and the free end of which is subjected to the action of a spring (81, 810) in such a manner that a pressure force on the slideway (2) is transmitted to the roller mounted rotatably on this second shaft.

11. An apparatus according to claim 10, characterized by the fact that the play take-up device comprises an adjustable spring stop (83) the axis of which is perpendicular to the face of the slideway (2) against which the roller rotatably mounted on the second shaft (56, 560) is elastically pressed.

12. An apparatus according to claim 10, characterized by the fact that tongue (80) borne by the second shaft (56) of the play take-up device is located between the two arms of a fork (78) borne by the slide (4) and is subjected at its free end to the thrust of a compression spring (81) housed in a debouching hole (82) in the slide.

13. An apparatus according to claim 10, characterized by the fact that the tongue (800) borne by the second shaft (560) of the play take-up device is outside the slide (4) and is borne by an extension (85) of the second shaft (560), and by the fact that the free end of said tongue is subjected to the traction of a traction spring (810) attached to a pivot (86) fastened to the slide.

* * * * *